United States Patent
Sun et al.

(10) Patent No.: US 8,787,193 B2
(45) Date of Patent: Jul. 22, 2014

(54) WIRELESS COMMUNICATION SYSTEM APPLIED TO AVIATION INDUSTRY AND AIRBAND INTERFERENCE DETECTION METHOD

(75) Inventors: Chen Sun, Koganei (JP); Yohannes Alemseged Demessie, Koganei (JP); Ha Nguyen Tran, Koganei (JP); Hiroshi Harada, Koganei (JP)

(73) Assignee: National Institute Of Information And Communications Technology, Tokyo (JP)

( * ) Notice: Subject to any disclaimer, the term of this patent is extended or adjusted under 35 U.S.C. 154(b) by 196 days.

(21) Appl. No.: 13/522,712

(22) PCT Filed: Jan. 14, 2011

(86) PCT No.: PCT/JP2011/000184
§ 371 (c)(1),
(2), (4) Date: Jul. 17, 2012

(87) PCT Pub. No.: WO2011/089875
PCT Pub. Date: Jul. 28, 2011

(65) Prior Publication Data
US 2012/0287804 A1 Nov. 15, 2012

(30) Foreign Application Priority Data
Jan. 19, 2010 (JP) .................................. 2010-009195

(51) Int. Cl.
| H04L 12/26 | (2006.01) |
| H04W 4/20 | (2009.01) |
| H04B 1/10 | (2006.01) |
| H04W 24/10 | (2009.01) |
| H04W 28/04 | (2009.01) |
| H04W 84/06 | (2009.01) |

(52) U.S. Cl.
CPC ............. *H04B 1/1027* (2013.01); *H04W 24/10* (2013.01); *H04W 28/048* (2013.01); *H04W 4/20* (2013.01); *H04W 84/06* (2013.01)
USPC .......................... 370/252; 370/310; 455/161.1

(58) Field of Classification Search
None
See application file for complete search history.

(56) References Cited

U.S. PATENT DOCUMENTS 7,898,395 B2 * 3/2011 Green ......................... 340/384.7
8,279,767 B2 * 10/2012 Kang et al. ..................... 370/252
(Continued)

FOREIGN PATENT DOCUMENTS

| JP | 10-243462 A | 9/1998 |
| JP | 2005-176057 A | 6/2005 |
| JP | 2011-024126 A | 2/2011 |

OTHER PUBLICATIONS

International Search Report for PCT/JP2011/000184 from the Japanese Patent Office completed on Mar. 3, 2011 and mailed Mar. 15, 2011 (2 pages).

*Primary Examiner* — Brian Roberts
(74) *Attorney, Agent, or Firm* — Pyprus Pte Ltd

(57) ABSTRACT

Provided is a wireless communication system capable of increasing safety in the aviation industry, and applicable to the aviation industry.
The wireless communication system comprises a control device and a spectrum sensor. The spectrum sensor performs spectrum sensing using a measurement SAP, receives a signal from a wireless communication device, and transmits information relating to the received signal as sensing information through a communication SAP. On the other hand, the control device receives the sensing information from the spectrum sensor through the communication SAP. Subsequently, the sensing information is analyzed using an application SAP. Thereby, whether or not the signal from the wireless communication device interferes with the radio waves of the airband used in the aviation industry is specified.

13 Claims, 5 Drawing Sheets

(56) References Cited

U.S. PATENT DOCUMENTS

| | | | |
|---|---|---|---|
| 8,688,046 B2* | 4/2014 | Hershey et al. | 455/62 |
| 8,688,132 B2* | 4/2014 | Lindoff et al. | 455/448 |
| 2003/0093187 A1* | 5/2003 | Walker | 701/1 |
| 2009/0103462 A1* | 4/2009 | Twitchell, Jr. | 370/310 |
| 2012/0322360 A1* | 12/2012 | Sen | 455/1 |

* cited by examiner

WIRELESS COMMUNICATION SYSTEM APPLIED TO AVIATION INDUSTRY AND AIRBAND INTERFERENCE DETECTION METHOD

TECHNICAL FIELD

The present invention relates to a wireless communication system applied to the aviation industry, and an airband interference detection method, and particularly to a wireless communication system capable of detecting a wireless communication device (such as notebook-type personal computer or mobile phone) brought by a passenger and used at an airport, and an airband interference detection method.

BACKGROUND ART

At present, wireless communication is used so widely and many products or merchandise are set to be wirelessly communicable. For example, a wireless mouse can be used for a notebook-type personal computer. A wireless remote controller is used for many toys for kids. A wireless earphone is used for a wireless player. Further, at present everyone owns and daily uses a mobile phone.

The wirelessly communicable products as described above cannot send a signal in the frequency band (airband: 108 MHz to 137 MHz) used in the aviation industry. However, the products may send a spurious signal (unwanted signal) in a frequency band belonging to the airband.

However, a user cannot determine whether the products may send a spurious signal. Thus, a person who is taking a trip can hardly expect that a wireless communication device which he/she brings to an airport causes communication devices (such as navigational equipment of an aircraft) making indispensable communication for the aviation industry to erroneously operate, consequently endangering a fright of the aircraft.

Additionally, the above situation has not actually occurred so far, and thus a method or a system for avoiding such a situation has not been proposed at all (no prior art document information). Thus, cabin attendants and the like of an aircraft only ask passengers to turn off the power supplies of wireless communication devices before leaving. However, the passengers may forget or fail to turn off the power supplies of the wireless communication devices due to the hustling during travel.

Therefore, it is required to specify a wireless communication device sending a signal which can deteriorate safety in the aviation industry.

SUMMARY OF INVENTION

Technical Problem

It is an object of the present invention to provide a wireless communication system capable of efficiently preventing above situations and applicable to the aviation industry, and an airband interference detection method. Specifically, it is an object to provide a wireless communication system capable of specifying a wireless communication device which can interfere with the radio wave in the airband used in the aviation industry and increasing safety in the aviation industry, and an airband interference detection method.

Solution to Problem

The present invention relates to a wireless communication system applied to the aviation industry. The wireless communication system includes a control device including a first communication SAP (Service Access Point) and an application SAP, and a spectrum sensor including a second communication SAP and a measurement SAP.

The spectrum sensor performs spectrum sensing by use of the measurement SAP, thereby to receive a signal from a wireless communication device. Subsequently, it sends information on the received signal as sensing information via the second communication SAP. On the other hand, the control device receives the sensing information from the spectrum sensor via the first communication SAP. Subsequently, it analyzes the sensing information by use of the application SAP. Thereby, whether the signal from the wireless communication device interferes with the radio waves in the airband used in the aviation industry is specified. Then, the wireless communication device which is sending the specified signal is turned off, thereby increasing safety in the aviation industry.

According to a preferred aspect of the present invention, the measurement SAP produces the sensing information to be classified into a control message class, a sensor message class, a sensing message class, and a regulatory information class. Then, the measurement SAP contains information on the estimation result of the frequency of the signal from a wireless communication device as estimated frequency information in the sensing message class. In this case, the application SAP specifies, based on information on the estimated frequency information contained in the sensing message class of the sensing information, whether the signal from the wireless communication device interferes with the radio waves in the airband. With the classification, a wireless communication device which can cause an airband interference can be efficiently (or rapidly) specified.

Further, according to a preferred aspect of the present invention, the control device further includes an alerter for giving an alert. The alerter is configured to give an alert when the control device specifies that a signal from a wireless communication device interferes with the radio waves in the airband. Thereby, the wireless communication device which can cause an airband interference can be found according to the alert.

Further, according to a preferred aspect of the present invention, the control device is installed at a boarding gate in an airport and the spectrum sensor is portable. In this case, the control device can specify, based on the sensing information from the movable spectrum sensor, the position of a wireless communication device. Thereby, the wireless communication device which can cause an airband interference can be searched in a wider range.

Further, according to a preferred aspect of the present invention, when the control device specifies that the signal from the wireless communication device interferes with the radio waves of the airband, the fact is notified to the spectrum sensor via the first communication SAP and the second communication SAP. The information to be notified to the spectrum sensor can be information On a kind or frequency of a radio wave to be detected. Thereby, a wireless communication device can be found even near the spectrum sensor.

Further, according to a preferred aspect of the present invention, a plurality of spectrum sensors are present. In this case, the control device integrates the sensing information from the plurality of spectrum sensors. Thereby, many items of sensing information can be collected.

Furthermore, another aspect of the present invention relates to an airband interference detection method. The airband interference method is directed for specifying whether an interference is occurring in the airband used in the aviation industry by use of a wireless communication system.

The wireless communication system includes a control device including a first communication SAP and an application SAP, and a spectrum sensor including a second communication SAP and a measurement SAP.

With the airband interference detection method, the spectrum sensor first conducts the step of performing spectrum sensing by use of the measurement SAP thereby to receive a signal from a wireless communication device. Subsequently, it conducts the step of sending information on the signal received by the spectrum sensor as sensing information via the second communication SAP and the first communication SAP. Thereby, the sensing information (signal information) is sent from the spectrum sensor to the control device. Then, the control device conducts the step of analyzing the sensing information by use of the application SAP thereby to specify whether the signal from the wireless communication device interferes with the radio waves in the airband. By this step, interference in the airband is detected. Thus, another aspect can also obtain the effects similar to the above invention. Further, when it is specified that the signal from the wireless communication device interferes with the radio waves in the airband, the fact is notified from the control device to the spectrum sensor. The information to be notified can be information on a kind or frequency of a radio wave to be detected.

Advantageous Effects of Invention

According to the present invention, a wireless communication device which can interfere with the radio waves in the airband used in the aviation industry can be specified, thereby increasing safety in the aviation industry.

DESCRIPTION OF EMBODIMENTS

Embodiments for implementing the present invention will be described below with reference to the drawings. However, the following embodiments described below are exemplary, and may be varied as needed within the apparent scope for those skilled in the art.

A wireless communication system according to the present invention includes a plurality of wireless communication devices. Herein, each wireless communication device is generally configured to find other wireless communication device by performing spectrum sensing, thereby making wireless communication (data exchange).

Therefore, in order to make wireless communication, the wireless communication system requires three functions of a function of performing spectrum sensing, a function of analyzing sensing information as a result of the spectrum sensing, and a function of performing at least one of data sending and receiving. In order to achieve the three functions, an interface common between a plurality of wireless communication devices is needed. The sensing information will be first described, and then the interface will be described.

According to the present invention, the sensing information is first classified into four message classes. The classification can be performed by use of an object oriented unified modeling language (UML) diagram, for example. That is, the sensing information is represented by the UML, diagram. With the classification, a plurality of service access points (SAP) can be defined in a reference model described with reference to FIG. 4, and primitives usable for obtaining and setting the sensing information can be defined.

The four message classes obtained by the classification includes a control message class, a sensor message class, a sensing message class, and a regulatory information class. They will be described below in detail.

<Control Message Class>

Figure 1:
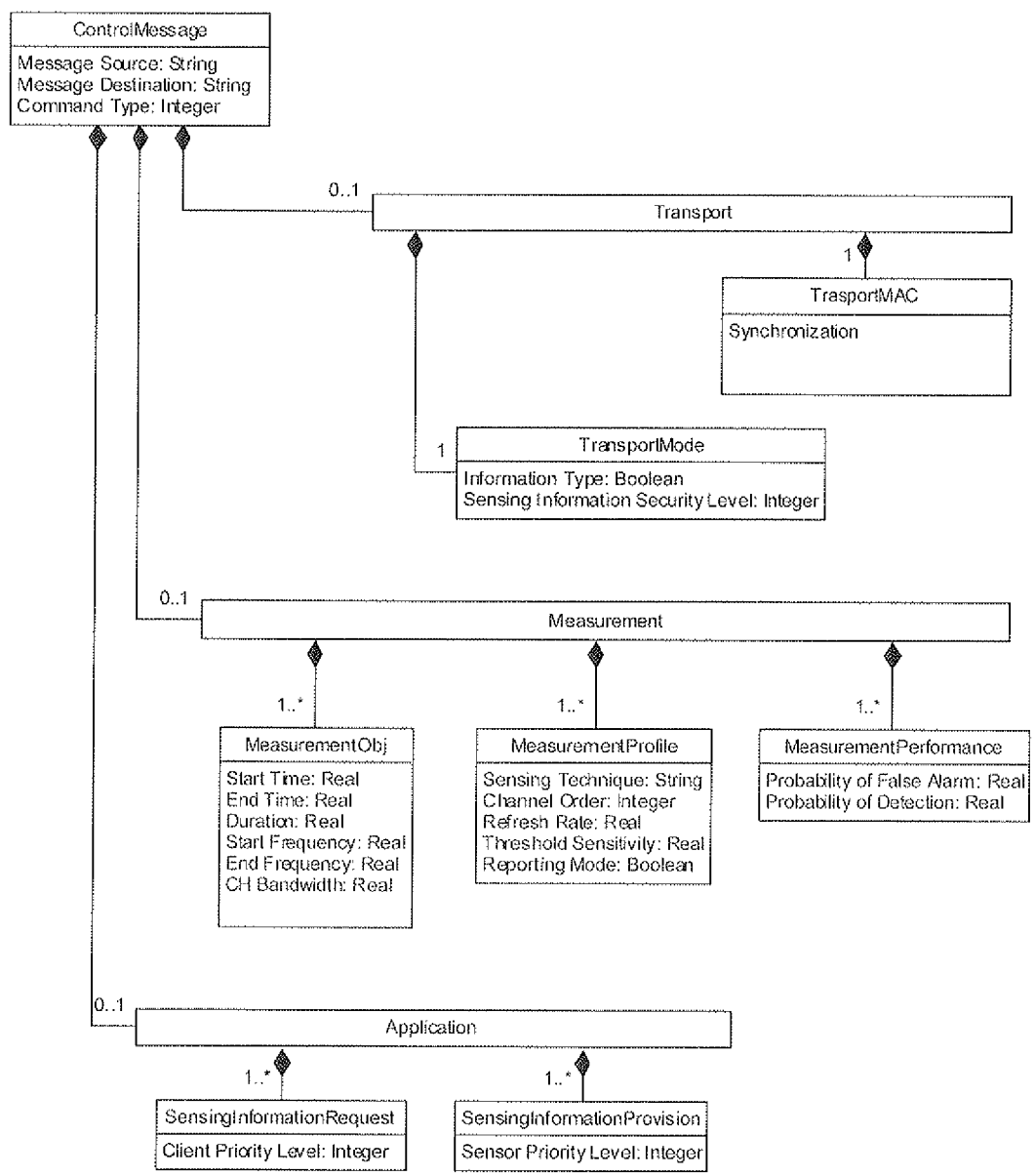
FIG. 1 is a diagram for explaining a control message class obtained by classifying sensing information according to the present invention.

As shown in FIG. 1, the control message class is directed for describing a control message for exchanging the sensing information between the spectrum sensor and its client.

The control message to be described is roughly classified into three classes. The three classes configuring the control message are transport, measurement and application. They will be described below in detail.

<<Transport>>

The class contains a message for controlling sending the sensing information. Each instance of the control message class can contain an instance of the transport class. The instance of the transport class may not be contained in the instance of the control message class.

<<<Transport MAC>>>

The class contains a message for controlling MAC for sending the sensing information. The instance of the transport class may contain only one instance of the transport MAC class.

<<<Transport Mode>>>

The class contains a message for controlling a send mode for exchanging the sensing information. The information type can be information on software or information on hardware, for example. The instance of the transport class may contain only one instance of the transport mode class.

<<Measurement>>

The class contains a message for controlling spectrum measurement. An instance of each control message class can contain a plurality of instances of the measurement class. The instances of the measurement class may not be contained in the instance of the control message class.

<<<Measurement Object>>>

The class contains a message for controlling objects to be measured. For example, the objects to be measured can be a frequency to start measuring a wireless frequency and a frequency to finish measuring the same. Thereby, a range of a wireless frequency to be measured is defined. The instances of the measurement class can contain one or more instances of the measurement object class.

<<<Measurement Profile>>>

The class contains a message for controlling a measurement operation. The measurement operation may determine a technique used for spectrum sensing, for example. An arbitrary instance of the measurement class may contain one or more instances of the measurement profile class.

<<<Measurement Performance>>>

The class contains a message for controlling performance of the wireless frequency measurement. The performance can be a desired erroneous report probability as an output of the spectrum sensing, for example. An arbitrary instance of the measurement class may contain one or more instances of the measurement profile class.

<<Application>>

The class contains a message for controlling requesting the sensing information or supplying the sensing information. An instance of each control message class can contain a plurality of instances of the application class. The instances of the application classes may not be contained in the instance of the control message class.

<<<Sensing Information Request>>>

The class contains a message for setting a priority level for a client requesting the sensing information. Each instance of the application class contains one or more instances of the sensing information request class.

<<<Sensing Information Supply>>>

The class contains a message for setting a priority level for a sensor when the sensing information is to be sent to its client. Each instance of the application class contains one or more instances of the sensing information send class.

<Sensor Message Class>

Figure 2:
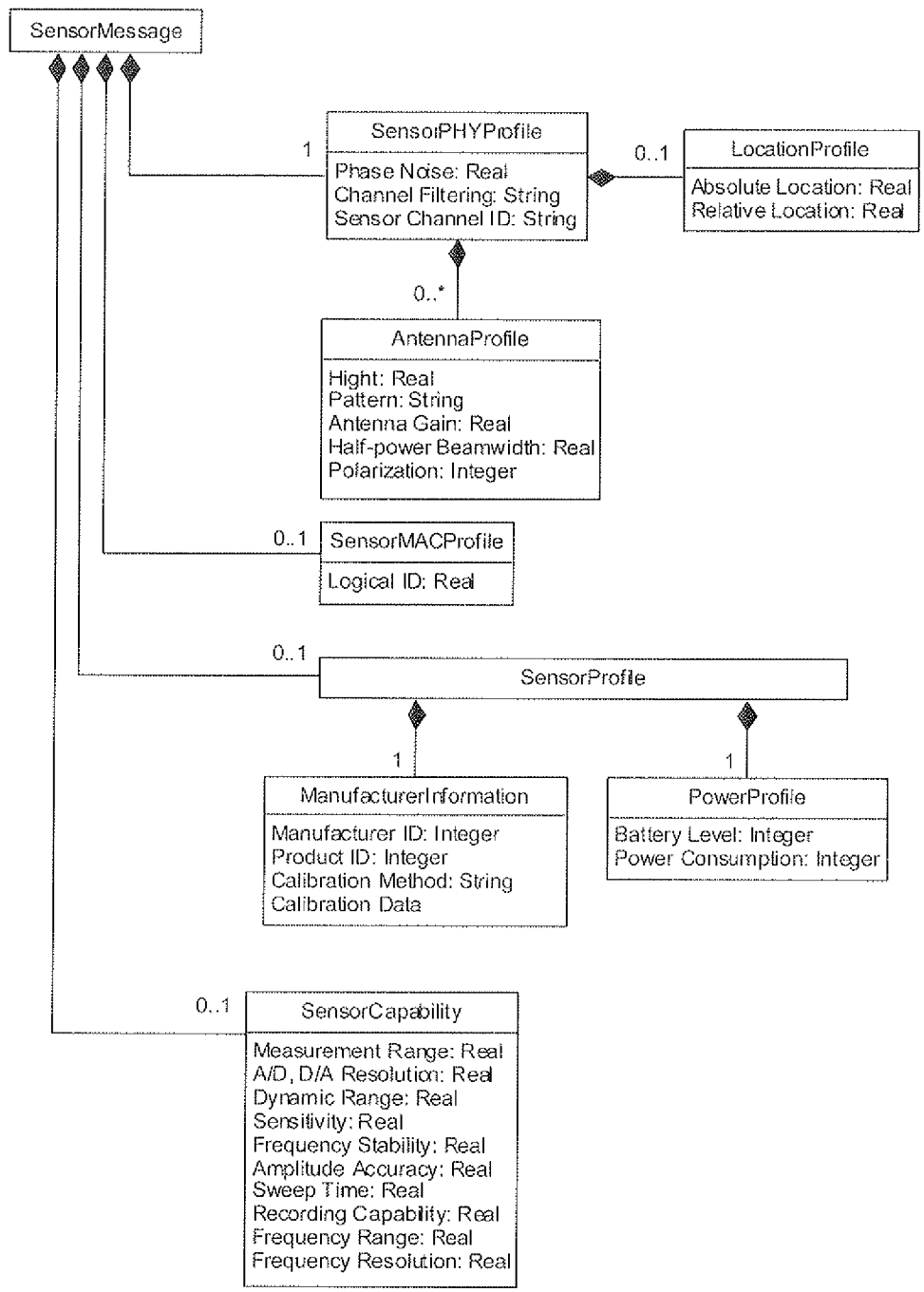
FIG. 2 is a diagram for explaining a sensor message class obtained by classifying the sensing information according to the present invention.

Subsequently, the sensor message class will be described. The class describes therein a message associated with the sensor as shown in FIG. 2. Its details will be described below.

<<Sensor PHY Profile>>

The class contains information on sensor PHY. The information on sensor PHY can be a phase noise, for example. Each instance of the sensor message may contain only an instance of the sensor profile.

<<<Location Profile>>>

The class contains information on a sensor location. The sensor location can be an absolute position or relative position. Each instance of the sensor PHY profile contains one or more instances of the sensing information request class.

<<<Antenna Profile>>>

The class contains information on a sensor antenna. The sensor antenna can be antenna high, beam pattern or the like. Each instance of the sensor PHY profile contains one or more instances of the antenna profile class. The instances of the antenna profile class may not be contained in the instance of the antenna profile.

<<Sensor MAC Profile>>

The class contains information on sensor MAC. The information on sensor MAC can be an ID of the MAC, for example. Each instance of the sensor message can contain only one instance of the sensor MAC profile class. The instance of the sensor MAC profile class may not be contained in the instance of the sensor message.

<<Sensor Profile>>

The class contains general information on the sensor. Each instance of the sensor message can contain only one instance of the sensor profile class. The instance of the sensor MAC profile class may not be contained in the instance of the sensor message.

<<<Manufacturer Information>>>

The class contains information on a sensor manufacturer. The sensor manufacturer information can be a manufacturer ID or a product ID, for example. Each instance of the sensor profile class contains one instance of the manufacturer information class.

<<<Output Profile>>>

The class contains information on sensor output information. The sensor output information can be a power level of the power supply or the amount of consumed power, for example. Each instance of the sensor profile class contains one instance of the output profile class.

<<Sensor Capability>>

The class contains information on a sensor capability when the sensor measures a wireless spectrum. The information can be a measurement range or sensitivity. Each instance of the sensor message can contain only one instance of the sensor profile class. The instance of the sensor MAC profile may not be contained in the instance of the sensor message.

<Sensing Message Class>

Figure 3:
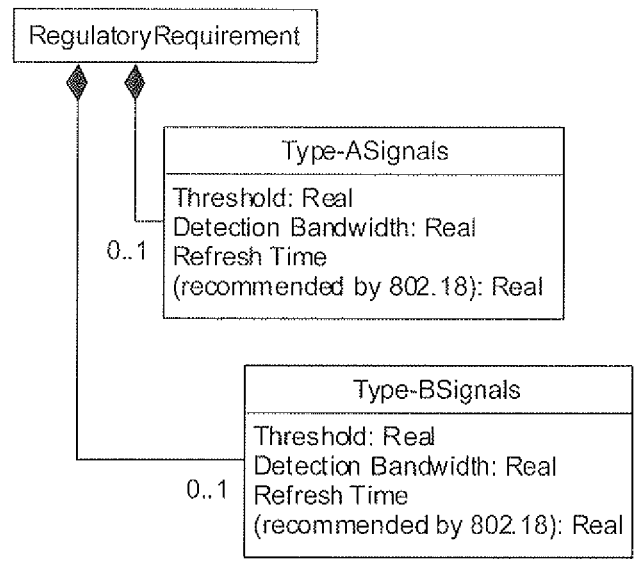
FIG. 3 is a diagram for explaining a sensing message class obtained by classifying the sensing information according to the present invention.

Subsequently, the sensing message class will be described. The class describes therein a message indicating a sensing result as shown in FIG. 3. It will be described below in detail.

<<Sensing Information Profile>>

The class contains general information on a measurement made for producing the sensing information. The information can be a confidence level of the measurement, measurement characteristics, a threshold used in the measurement, and the like. The instance of the sensing message class may contain only an instance of the sensing information class.

<<Location Information>>

The class contains information on a location when a measurement is made. The information can be an absolute position or relative position. Each instance of the sensing message class can contain one instance of the location information class. The instance of the location information class may not be contained in each instance of the sensor message class.

<<Signal>>

The class contains information on a measured signal. Each instance of the sensing message class contains one or more instances of the signal class.

<<<Signal Profile>>>

The class contains information on a measured signal. The information can be a signal level, an estimated amplitude, and the like. Each instance of the signal class contains only one instance of the signal profile class.

<<<Signal behavior>>>

The class contains information describing a behavior of a measured signal (such as duty cycle). One instance of the signal class can contain one instance of the signal behavior class. The instance of the signal behavior class may not be contained in the instance of the signal class.

<<Channel>>

The class contains information on a measured channel. Each instance of the sensing message class can contain one or more instances of the channel class. The instances of the channel class may not be contained in the instance of the sensing message class.

<<<Channel Profile>>>

The class contains general information on a measured channel. The information can be a start frequency or an end frequency, for example. Each instance of the channel class contains only one instance of the channel profile class.

<<<Channel Measurement>>>

The class contains information on channel measurement results (such as measured bandwidth or noise power). Each instance of the channel can contain one instance of the channel measurement class. The instance of the channel measurement class may not be contained in the instance of the channel class.

<<RAT (Wireless Access Technology)>>

The class contains information on a measured RAT. Each instance of the sensing message class can contain one or more instances of the RAT class. The instances of the RAT class may not be contained in the instance of the sensing message class.

<<<RAT Profile>>>

The class contains general information on a measured RAT (such as ID of the RAT). Each instance of the RAT class contains only one instance of the RAT profile class.

<<<RAT Measurement>>>

The class contains information on RAT measurement results (such as measured bandwidth or noise power). Each instance of the RAT class can contain one instance of the RAT measurement class. The instance of the RAT measurement class may not be contained in the instance of the RAT class.

<Regulatory Information Class>

Figure 4:
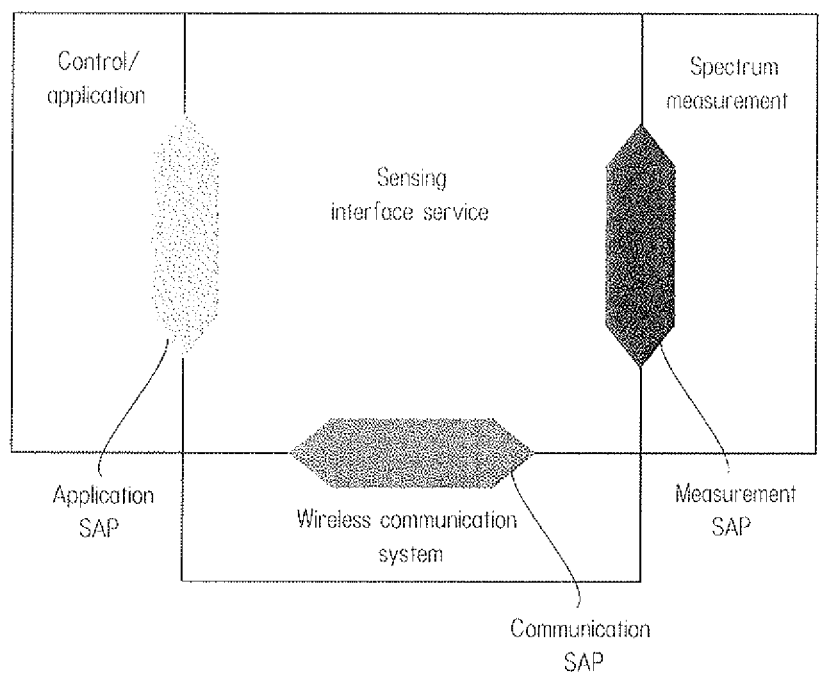
FIG. 4 is a diagram for explaining a reference model of an interface according to the present invention.

Subsequently, the regulatory information class will be described. The class contains a regulatory request as shown in FIG. 4. A plurality of regulatory requests depend on mutually different signals of primary users (type-A primary user and type-B primary user) at mutually different locations. They will be described below in detail.

<<Type A Signal>>

The class contains a request of regulating a signal of the type-A primary user. The request can be a detection threshold, detection bandwidth or the like. Each instance of the regulatory information class can contain one instance of the type-A signal class. The instance of the type-A signal class may not be contained in the instance of the regulatory information class.

<<Type-B Signal>>

The class contains a request of regulating a signal of the type-B primary user. The request can be a detection threshold or detection bandwidth. Each instance of the regulatory information class can contain one instance of the type-B signal class. The instance of the type-B signal class may not be contained in the instance of the regulatory information class.

As described above in detail, the sensing information is classified into four classes. A reference model is constructed based on the classification. The reference model is directed for exchanging the sensing information as described in Patent Application No. 2009-169347. It will be described below in detail.

FIG. 4 is a schematic diagram for explaining a reference model of an interface mounted on a wireless communication device configuring the wireless communication system according to the present invention.

The reference model shown in FIG. 4 indicates a basic configuration of the interface mounted on the wireless communication device configuring the wireless communication system, and is effective in mounting the interface. That is, the sensing interface is directed for defining a data configuration suitable for exchanging information such as the sensing information, and the data configuration needs to be read between all the constituents in the cognitive wireless communication system. The interface preferably conforms to the standard (such as IEEE 1900.6), but any interface according to the reference model described herein may be employed.

The reference model (sensing interface service) is partially or entirely applied as an interface of each constituent (spectrum sensor, cognitive engine (CE), and data archive (DA)) in the wireless communication system. Further, the function necessary for providing the sensing interface service or its interface can access any hierarchy in an open system interconnection model (OSI model) in ISO/IEC7948-1:1994.

As shown in FIG. 4, the sensing interface service contains three service access points (SAP). SAP means a concept of a logical address in the OSI model, and generally corresponds to an interface between hierarchies. The three SAPs of the reference model according to the present embodiment are specifically communication SAP (C-SAP), application SAP (A-SAP) and measurement SAP (M-SAP). The reference model according to the present embodiment is characterized in that every SAP can relate to three or more hierarchies (such as network layer, data link layer and physical layer) depending on a scenario. The three SAPs are used so that the sensing information can be exchanged between one or more spectrum sensors and its client in the wireless communication system.

The three SAPs will be described below in detail. Each SAP configures a logical interface, and is discriminable from other SAPs. In each SAP, the above classification is used to describe (define) primitives. The primitives are used for obtaining or setting the sensing information.

<Communication SAP>

The communication SAP provides a communication service used for exchanging information such as the sensing information between the spectrum sensor and its client. In this way, the communication SAP can relate to the hierarchies (network layer, data link layer, and physical layer).

The client role can be taken by the spectrum sensor, the cognitive engine (CE) and the data archive (DA). For example, when the spectrum sensor is of a standalone type to independently operate from the wireless communication device, communication between the spectrum sensor and the cognitive engine (CE) relates to two hierarchies of the SAP between the PHY and the MAC and the SAP between the MAC and the network.

The communication SAP schematically corresponds to a communication mechanism (subsystem) in a constituent of the cognitive wireless communication system. The communication SAP does not necessarily need to relate to two or more hierarchies. For example, when the spectrum sensor is incorporated in the cognitive wireless communication device, communication between the spectrum sensor and the cognitive engine (CE) is made by use of a data bus in the wireless communication device, and thus does not need to relate to a plurality of hierarchies in the OSI model.

A specific explanation will be made below.

The communication SAP is used for exchanging the sensing information between the sensor and its client. The sensing information may contain a sensing message, a sensor message, a control message, and regulatory information with the above classification. The client role is to provide a set of generic primitives, to map (develop) the primitives on a transport protocol, and thereby to remove a communication mechanism from a cognitive wireless communication entity. Each primitive is described in a table form.

The cognitive wireless communication entity can obtain two services from the communication SAP. The two services are a sensing information send service and a sensing information receive service. They will be described below in detail.

<<Sensing Information Send Service>>

The primitive is used by the cognitive wireless communication entity to send the sensing information to other cognitive wireless communication entity. Specifically, the primitive is used by the cognitive wireless communication entity to send the sensing information via its communication SAP to other cognitive wireless communication entity including a communication SAP. More specifically, when the cognitive wireless communication entity requests the service, the cognitive wireless communication entity having received the request responds to the cognitive wireless communication entity having issued the request. The response contains a source ID, a destination of the sensing information, and information on the sensing information.

<<Sensing Information Receive Service>>

The sensing information receive service is used by the cognitive wireless communication entity to receive the sensing information from other cognitive wireless communication entity including a communication SAP. Specifically, the primitive corresponding to the sensing information receive service is used by the cognitive wireless communication entity to receive the sensing information via its communication SAP from other cognitive wireless communication entity including a communication SAP. More specifically, when the cognitive wireless communication entity requests the service, the cognitive wireless communication entity having received the request responds to the cognitive wireless communication entity having issued the request. The response contains a source ID, a destination of the sensing information, and information on the sensing information.

<Application SAP>

The application SAP provides an application service such as the sensing information to the constituent conforming to IEEE1900.6, for example. For example, the application SAP is used for the application in IEEE1900.6. Such an application uses the sensing information for its purpose (such as examination of policy or analysis of spectrum usage situation).

A specific explanation will be made below.

The application SAP is used by a control/application to exchange information with the sensing interface service of the cognitive wireless communication entity. The application SAP contains a set of generic primitives, and the primitives are used so that the cognitive wireless communication entity can control spectrum sensing or obtain the sensing information obtained by the spectrum sensing. Each primitive is described in a table form.

The cognitive wireless communication entity can obtain three services from the application SAP. The three services are a sensor discovery service, a sensing information access service, and a management/configuration service.

<<Sensor Discovery Service>>

The sensor discovery service provides a general framework through which the control/application belonging to the cognitive wireless communication entity can discover an available spectrum measurement module. Further, the service provides a general framework through which the control/application belonging to the cognitive wireless communication entity can discover an available communication subsystem. Thereby, there is provided a mechanism for sending the sensing information to other cognitive wireless communication entity including a communication subsystem. Specifically, with the service, an ID of the spectrum measurement module or an ID of the communication subsystem is discovered.

Herein, the primitives of the sensor discovery service are part of the application SAP. Each primitive is described in a table form.

The primitive of the spectrum measurement module ID is used by the control/application of the cognitive wireless communication entity to obtain a list of spectrum measurement module IDs.

The primitive of the communication subsystem ID is used by the control/application of the cognitive wireless communication entity to obtain a list of communication subsystem IDs.

<<Sensing Information Access Service>>

The sensing information access service provides a general framework through which the control/application belonging to the cognitive wireless communication entity can access the sensing information via a logical interface defined in the standard (IEEE1900.6). With the service, the control/application belonging to the cognitive wireless communication entity can read the sensing information or write the sensing information.

Herein, the primitives of the sensing information access service are part of the application SAP. Each primitive is described in a table form.

The primitive of the sensing information read is used by the control/application of the cognitive wireless communication entity to read the sensing information. Specifically, when requesting to read the sensing information according to the list, the control/application belonging to the cognitive wireless communication entity can obtain a response reflecting the result according to the request.

The primitive of the sensing information write is used by the control/application of the cognitive wireless communication entity to write the sensing information. Specifically, when requesting to write the sensing information according to the list, the control/application belonging to the cognitive wireless communication entity can obtain a response reflecting the result according to the request. The parameters for request and response are a sensing information list and a client priority list. The sensing information list is a list of sensing information which the control/application belonging to the cognitive wireless communication entity requests to write, or a list of requested sensing information.

<<Management/Configuration Service>>

The management/configuration service provides a general framework through which the control/application belonging to the cognitive wireless communication entity manages the cognitive wireless communication entity or configures communication between the cognitive wireless communication entities. That is, with the service, the control/application belonging to the cognitive wireless communication entity can manage the sensor or configure communication.

Herein, the primitives of the management/configuration service are part of the application SAP. Each primitive is described in a table form.

The sensor is managed by lock, unlock, breaklock, and trigger.

A primitive of lock is used by the control/application, and is directed for locking resources such as the spectrum measurement modules or the communication subsystem. The lock can prevent the resources from being accessed by other control/application. On the other hand, when a primitive of unlock or a primitive of breaklock is used, other control/application can access the resources. Lock, unlock, and breaklock of the resources are performed by the control/application as needs, and the results are notified to each resource. Thus, during lock, unlock and breaklock of the resources, the ID of the spectrum measurement module or the ID of the communication subsystem is used as a parameter.

A primitive of trigger is used by the control/application of the cognitive wireless communication entity to trigger a specific operation (event). Event ID, trigger time, and timeout are used as the parameters for requesting trigger. The event ID is specific to a particularly triggered event. The trigger time is a start time of the trigger operation, for example. The timeout is a maximum time to wait for a timeout error. When the primitive of trigger is used, the trigger result (event ID and its event status) is notified as a response to the control/application.

A primitive of communication configuration (primitive of communication management) is used by the control/application of the cognitive wireless communication entity to manage communication available on the cognitive wireless communication entity. Specifically, the primitive of communication configuration is used by the control/application of the cognitive wireless communication entity to obtain a communication type (network type) of the cognitive wireless communication entity.

<Measurement SAP>

The measurement SAP provides a reconfiguration service or measurement service in order to manage the spectrum measurement function of the spectrum sensor. That is, the measurement SAP can also relate to a plurality of hierarchies depending on a scenario. The spectrum measurement function includes analog/digital conversion (ADC), digital/analog conversion (DAC), filtering, and signal status, for example.

The measurement SAP provides a set of generic primitives through which the cognitive wireless communication entity controls spectrum sensing, or performs spectrum sensing thereby to obtain the sensing information. Each primitive is described in a table form.

The cognitive wireless communication entity can obtain four services from the measurement SAP. The four services are a measurement capability discovery service, a measurement configuration discovery service, a measurement configuration set service, and an information service.

<<Measurement Capability Discovery Service>>

The measurement capability discovery service is directed for providing a general framework through which the cognitive wireless communication entity can obtain information on a measurement capability of the entity.

A primitive of the measurement capability discovery service is part of the measurement SAP, and is used by the cognitive wireless communication entity to obtain information on a capability of the spectrum measurement module (spectrum sensor). Specifically, when the cognitive wireless communication entity requests the service, the spectrum measurement module responds to the cognitive wireless communication entity in response to the request. The response contains information on measurement capability ID, measurement range and resolution.

<<Measurement Configuration Discovery Service>>

The measurement configuration discovery service provides a general framework through which the cognitive wireless communication entity can obtain information on a measurement configuration of the spectrum measurement module. Specifically, when the cognitive wireless communication entity requests the service, the spectrum measurement module responds to the cognitive wireless communication entity in response to the request. The response contains a sensor PHY profile, a sensor antenna profile, and a sensor location profile.

Herein, the primitives of the profiles are part of the measurement SAP. The primitive of the sensor PHY profile is used by the cognitive wireless communication entity to obtain information on a physical configuration of the spectrum measurement module (such as information specific to the PHY profile of the spectrum measurement module). The primitive of the sensor antenna program is used by the cognitive wireless communication entity to obtain information on an antenna configuration of the spectrum measurement module (such as information specific to the antenna profile of the spectrum measurement module). The primitive of the sensor location profile is used by the cognitive wireless communication entity to obtain information on a location of the spectrum measurement module.

<<Measurement Configuration Discovery Set Service>>

The measurement configuration discovery set service provides a general framework through which the cognitive wireless communication entity can set a configuration of the spectrum measurement module. Specifically, when the cognitive wireless communication entity requests the service, the configuration (measurement object, measurement profile, and measurement performance) according to the request is set as the parameters in the spectrum measurement module. The spectrum measurement module returns the result of the set of parameters as a response to the cognitive wireless communication entity.

Herein, the primitives of the profiles are part of the measurement SAP. The primitive of the measurement object is used by the cognitive wireless communication entity to set a measurement object of the spectrum measurement module (for example, to set information specific to a measurement object of the spectrum measurement module). The primitive of the measurement profile is used by the cognitive wireless communication entity to set a measurement profile of the spectrum measurement module. The primitive of the sensor location profile is used by the cognitive wireless communication entity to set a target value of the performance of the spectrum measurement module.

<<Information Service>>

The information service provides a general framework through which the cognitive wireless communication entity can collect information on a measurement configuration of the spectrum measurement module. Specifically, when the cognitive wireless communication entity requests the service, the spectrum measurement module responds to the cognitive wireless communication entity in response to the request. The response contains a sensor profile, a measurement profile, a signal measurement, a channel measurement, and a RAT measurement. The primitives of the profiles are part of the measurement SAP.

The primitive of the sensor profile contains two primitives. One is a primitive of a sensor manufacturer profile, and the other is a primitive of a sensor power profile. The two primitives (the primitive of the sensor profile) are used by the cognitive wireless communication entity to collect information on a manufacturer of the spectrum measurement module or information on a consumed power of the spectrum measurement module, respectively.

The primitives of the measurement profile contain two primitives. One is a primitive of the measurement profile, and the other is a primitive of the measurement location information. The two primitives (the primitive of the measurement profile) are used by the cognitive wireless communication entity to collect information on the spectrum measurement made by the spectrum measurement module and information on the position where the spectrum measurement module makes a spectrum measurement, respectively. The information on the spectrum measurement can be an ID of the sensor measurement profile, a priority level, a confidence, and the like.

The primitive of the signal measurement profile is used by the cognitive wireless communication entity to collect information on a measurement value of the measured signal. Herein, the information on a measurement value can be an ID of the signal measurement, a signal level, an estimated amplitude, an estimated phase, an estimated frequency, an estimated bandwidth, a modulation type, a duty cycle, a traffic pattern, and the like.

The primitive of the channel measurement profile is used by the cognitive wireless communication entity to collect information on a measurement value of the measured channel.

The primitive of the RAP measurement profile is used by the cognitive wireless communication entity to collect information on a measurement value of the measured RAT.

As described above in detail, the three SAPs for the sensing interface service are defined by the primitives using the above classification.

According to the present invention, the primitives are used in each SAP as described above thereby to construct the reference model (common interface) as shown in FIG. 4. One wireless communication device does not need to include all the three SAPs, unlike the reference model shown in FIG. 4. For example, a wireless communication system including a plurality of wireless communication devices can be configured as shown in FIG. 5 in order to exchange information between the spectrum sensor and its client.

Figure 5:
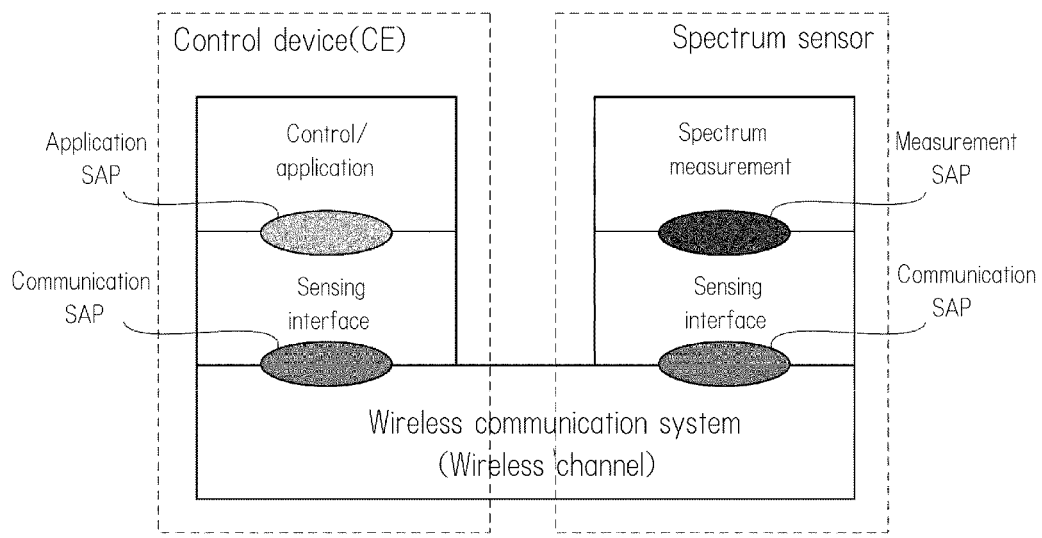
FIG. 5 is a diagram for explaining an exemplary wireless communication system configured with the reference model shown in FIG. 4.

In the example shown in FIG. 5, the control device mounting the cognitive engine (CE) thereon is provided with the application SAP and the first communication SAP, and the spectrum sensor is provided with the measurement SAP and the second communication SAP, thereby configuring the wireless communication system.

In the wireless communication system, the spectrum sensor first uses the measurement SAP (spectrum measurement part) to perform spectrum sensing, thereby receiving a signal from the wireless communication device. Subsequently, the spectrum sensor sends information on the received signal as the sensing information via the second communication SAP. On the other hand, the control device receives the sensing information from the spectrum sensor via the first communication SAP. Subsequently, the control device uses the application SAP (control/application) to accumulate the sensing information received from the spectrum sensor. Thus, the information from the spectrum sensor is collected in the control device. A plurality of spectrum sensors may be employed. In this case, many items of sensing information are collected and integrated in the control device.

The control device can use the application SAP (control/application) to analyze the sensing information received from the spectrum sensor and to perform a control operation according to the analysis result. According to the present invention, the sensing information is classified into the four classes including the control message class, the sensor message class, the sensing message class and the regulatory information class, and thus the control device can rapidly analyze the sensing information.

Particularly Preferred Embodiment

Subsequently, a particularly preferred embodiment according to the present invention will be described. The above wireless communication system according to the preferred embodiment is applied to the aviation industry.

Figure 6:
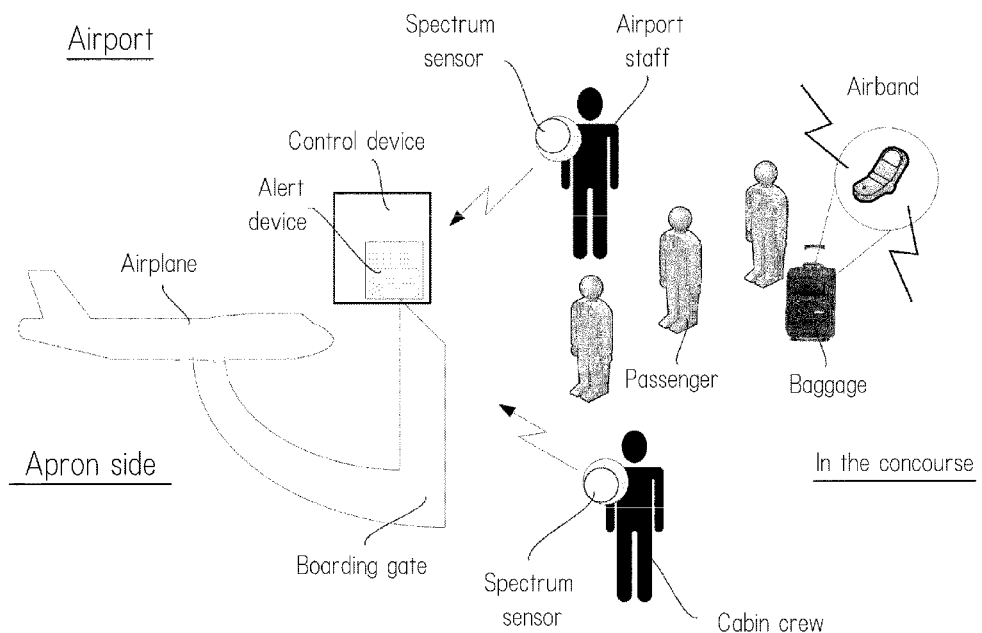
FIG. 6 is a diagram for explaining a configuration of a wireless communication system according to a most preferable embodiment of the present invention.
Figure 7:
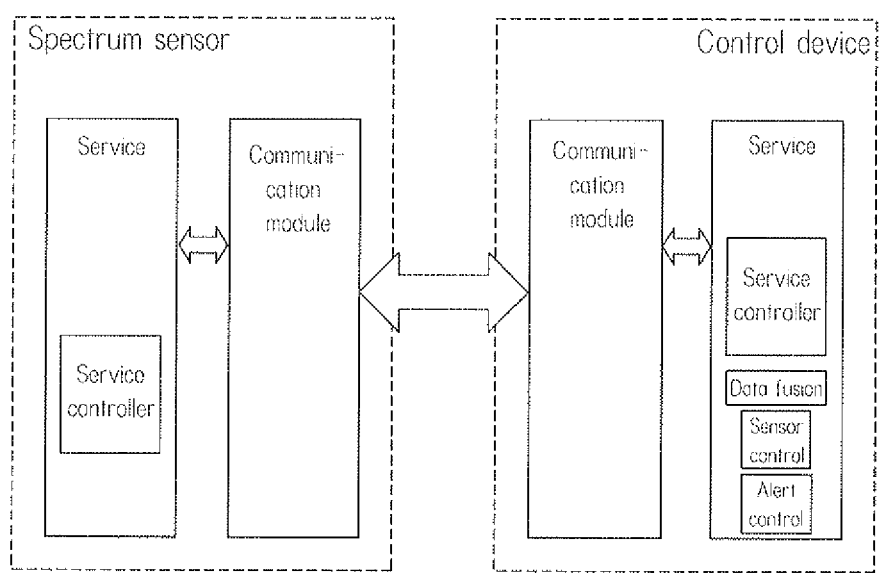
FIG. 7 is a diagram for explaining an exemplary model in which the configuration of FIG. 6 is made according to the reference model of FIG. 4.

Specifically, the wireless communication system is installed in an airport as shown in FIG. 6. In the example shown in FIG. 6, the wireless communication system is configured of the control device and a plurality of spectrum sensors. FIG. 7 shows that the wireless communication system shown in FIG. 6 is represented according to the reference model shown in FIG. 4.

The control device is directed for receiving or processing the sensing information, or for controlling the wireless communication system or making necessary determinations. In the example shown in FIG. 6, the control device is provided near a boarding gate in an airport concourse. At the boarding gate, passengers pass with baggage (such as hand baggage (FIG. 6) or checked-in baggage). In the present embodiment, the control device mounts an alerter thereon. The alerter is directed for giving an alert, and operates under control of the control device (specifically, an alert signal).

The spectrum sensor includes only the measurement SAP and the communication SAP, and thus is compact and portable. In the present embodiment, the spectrum sensor is embedded in a badge or tag on clothes of airport staff, and is movable. The spectrum sensor may be directly mounted on clothes of airport staff. The airport staff may include security guards, ushers, cabin attendants and the like. The spectrum sensor may be installed as a baggage sensor in an airport concourse.

In the wireless communication system, the sensing information from a plurality of spectrum sensors is collected in the control device. That is, the control device functions as an integrate device for integrating the sensing information. Subsequently, the control device specifies a signal which can interfere with the radio waves in the airband (108 MHz to 137 MHz) used in the aviation industry based on the sensing information received from the spectrum sensors (such as the estimated frequency information contained in the sensing message class). That is, the control device also functions as an airband interference detector. An electronic device for sending a signal which can interfere with the radio waves in the airband can be a passenger's mobile phone, a personal computer, and a game player, which are forgotten to turn off the power supply. When specifying such a signal, the control device generates and sends an alert signal to the alerter. The alerter gives an alert according the alert signal. The control device notifies the information on a kind or frequency of a radio wave to be detected to the spectrum sensor.

When an alerter gives an alert, airport staff finds a wireless communication device (such as mobile phone, personal computer, or game player) from the belongings such as passenger's baggage, and instructs the passenger to turn off the power supply of the wireless communication device. Thereby, the transmitter in the wireless communication device in an active state can be prevented from passing through a boarding gate, thereby securing safety in the aviation industry.

According to the above preferred embodiment, a plurality of spectrum sensors distributed in a concourse are used (because of distributive sensing), a plurality of items of sensing information can be efficiently collected (integrated) in the control device. Each item of sensing information is classified, and thus the control device can efficiently process the plurality of items of sensing information and extract necessary information. In particular, in the present embodiment, the control device specifies information on the wireless communication device including the transmitter for sending an airband signal and uses the alerter to give an alert, and thus the wireless communication device can be prevented from passing through a boarding gate.

According to the above preferred embodiment, more preferably, the control device tracks the movement (relative location or direction) of the wireless communication device which can cause an airband interference on the basis of the sensing information. Thereby, the wireless communication device can be accurately prevented from passing through a boarding gate.

According to the above preferred embodiment (FIG. 6), the control device mounts the alerter thereon. However, the alerter may be physically away from the control device. The control device is installed near a boarding gate in the above preferred embodiment (FIG. 6), but may be installed not near a boarding gate. Further, in the wireless communication system shown in FIG. 6, the control device may be installed near a belt conveyer for carrying only passengers baggage.

A general wireless communication system aims to make wireless communication (data communication). On the other hand, the wireless communication system according to the present embodiment is only directed for finding an electronic device which can cause an airband interference. In other words, the present invention has a technical purpose in that the wireless communication system for data communication is specialized to airband interference detection.

In the above preferred embodiment, the alerter is used to give an alert when an airband interference is possible, but alerting is not limited thereto. For example, the control device may notify a possible airband interference to each spectrum sensor via the communication SAP. Thereby, the wireless communication device which can cause an airband interference is more likely to be rapidly found.

In the above embodiment, the wireless communication system is configured such that the sensing information is sent from each of the spectrum sensors to the control device. However, the configuration of the wireless communication system is not limited thereto. For example, the wireless communication system may be configured such that with a plurality of spectrum sensors as one platform, the sensing information from other spectrum sensors are integrated in the platform and then sent to the control device. The above embodiment may employ one spectrum sensor.

INDUSTRIAL APPLICABILITY

The present invention is suitably used in the aviation industry.

The invention claimed is:

1. A wireless communication system applied to aviation industry comprising:
   a control device including a first communication Service Access Point (SAP) and an application SAP; and
   a spectrum sensor including a second communication SAP and a measurement SAP;
   wherein the spectrum sensor
   receives a signal from a wireless communication device by performing spectrum sensing using the measurement SAP, and
   sends information on the received signal as sensing information via the second communication SAP,
   the control device
   receives the sensing information from the spectrum sensor via the first communication SAP, and
   specifies whether the signal from the wireless communication device interferes with the radio waves in the airband used in the aviation industry or not, by analyzing the sensing information using the application SAP.

2. The wireless communication system according to claim 1,
   wherein the measurement SAP
   produces the sensing information to be classified into a control message class, a sensor message class, a sensing message class, and a regulatory information class, and
   makes information on the estimation result of the frequency of the signal from a wireless communication, device as estimated frequency information to be contained in the sensing message class,
   the application SAP
   specifies whether the signal from the wireless communication device interferes with the radio waves in the airband or not, based on information on the estimated frequency information contained in the sensing message class of the sensing information.

3. The wireless communication system according to claim 1,
   wherein the control device further includes an alerter for giving an alert
   the alerter is configured to give an alert when the control device specifies that a signal from a wireless communication device interferes with the radio waves in the airband.

4. The wireless communication system according to claim 3,
   wherein the control device is installed at a boarding gate in an airport,
   the spectrum sensor is portable, and
   the control device specifies the position of a wireless communication device based on the sensing information from the movable spectrum sensor.

5. The wireless communication system according to claim 3,
   wherein the control device, when specifies that the signal from the wireless communication device interferes with the radio waves of the airband, notifies this fact to the spectrum sensor via the first communication SAP and the second communication SAP.

6. The wireless communication system according to claim 3,
   further comprising a second spectrum sensor,
   wherein the control device integrates the sensing information from the spectrum sensor and the second spectrum sensor.

7. The wireless communication system according to claim 1,
   wherein the control device is installed at a boarding gate in an airport,
   the spectrum sensor is portable, and
   the control device specifies the position of a wireless communication device based on the sensing information from the movable spectrum sensor.

8. The wireless communication system according to claim 7,
   wherein the control device, when specifies that the signal from the wireless communication device interferes with the radio waves of the airband, notifies this fact to the spectrum sensor via the first communication SAP and the second communication SAP.

9. The wireless communication system according to claim 7,
   further comprising a second spectrum sensor,
   wherein the control device integrates the sensing information from the spectrum sensor and the second spectrum sensor.

10. The wireless communication system according to claim 1,
    wherein the control device, when specifies that the signal from the wireless communication device interferes with the radio waves of the airband, notifies this fact to the Spectrum sensor via the first communication SAP and the second communication SAP.

11. The wireless communication system according to claim 10,
    further comprising a second spectrum sensor,
    wherein the control device integrates the sensing information from the spectrum sensor and the second spectrum sensor.

12. The wireless communication system according to claim 1,
further comprising a second spectrum sensor,
wherein the control device integrates the sensing information from the spectrum sensor and the second spectrum sensor.

13. An airband interference detection method for specifying whether an interference is occurring in the airband used in the aviation industry or not by using a wireless communication system,
wherein the wireless communication system comprises:
a control device including a first communication Service Access Point (SAP) and an application SAP; and
a spectrum sensor including a second communication SAP and a measurement SAP;
the airband interference detection method comprises:
a step of receiving a signal from a wireless communication device by performing spectrum sensing using the measurement SAP by the spectrum sensor;
a step of sending information on the signal received by the spectrum sensor as sensing information via the second communication SAP and the first communication SAP; and
a step of specifying whether the signal from the wireless communication device interferes with the radio waves in the airband or not, by analyzing the sensing information using the application SAP by the control device,
there by the wireless communication system can detect interferences in the airband.

* * * * *